Feb. 16, 1926.
J. B. HENRY
VEHICLE FENDER
Filed May 12, 1925
1,573,243
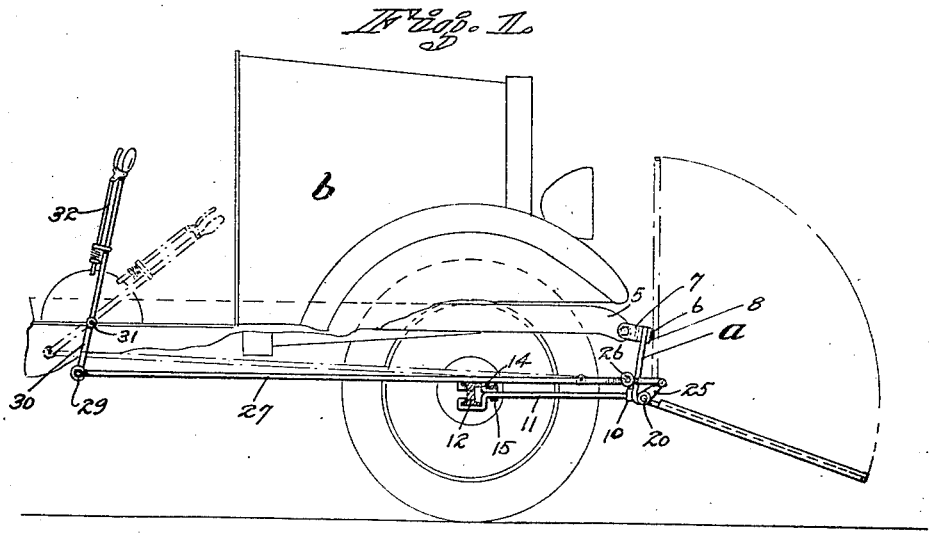
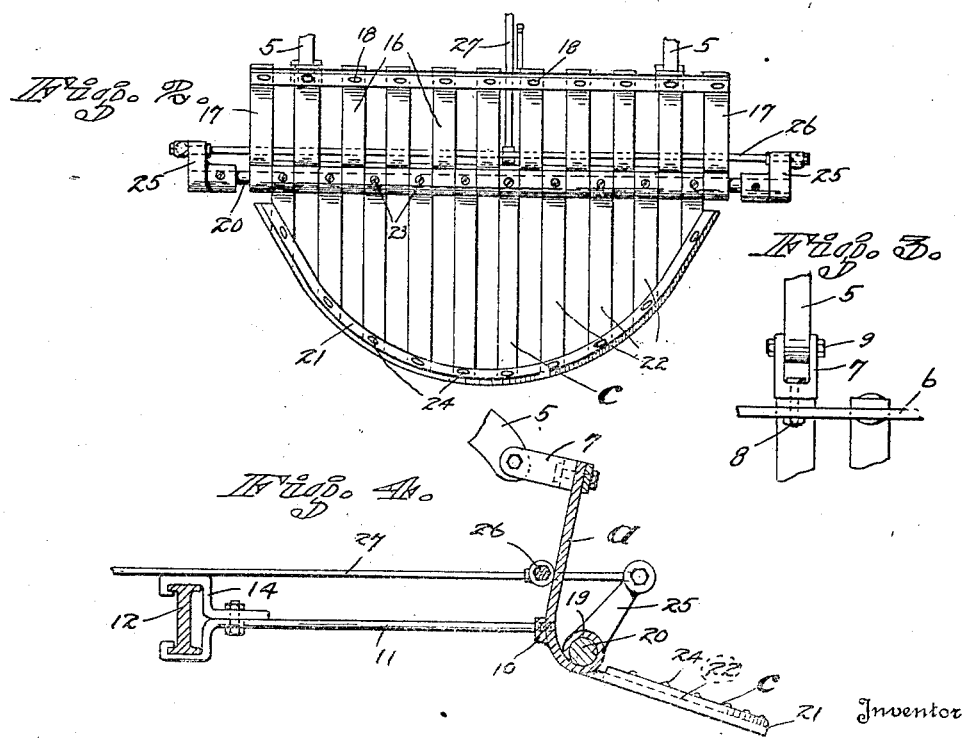
Inventor
JAMES B. HENRY
By
Attorneys Patented Feb. 16, 1926.

1,573,243

UNITED STATES PATENT OFFICE.

JAMES B. HENRY, OF BURLINGAME, CALIFORNIA.

VEHICLE FENDER.

Application filed May 12, 1925. Serial No. 29,799.

*To all whom it may concern:*

Be it known that I, JAMES B. HENRY, a citizen of the United States, and a resident of Burlingame, in the county of San Mateo and State of California, have invented a new and useful Improvement in Vehicle Fenders, of which the following is a specification.

The present invention relates to improvements in fenders for use in connection with motor vehicles.

The general object of the invention is to provide a construction adapted for imparting to a motor vehicle fender the properties of a combined fender and bumper.

The above and other objects are accomplished by instrumentalities pointed out in the following specification.

The invention is clearly defined in the claims.

A satisfactory embodiment of the invention is illustrated in the accompanying drawings forming part of the specification and in which Figure 1 is a side elevation of the device in use.

Figure 2 is a detail front elevation, also showing a fragment of the operating mechanism.

Figure 3 is a fragmentary plan of the connection between the chassis and one side of the fender frame.

Figure 4 is an enlarged detail partly in section and side elevation showing portions of the mountings and operating mechanism.

In the drawings the stationary back portion $a$ of the receiver is disposed transversely of the front end of the motor vehicle $b$ and slopes downwardly and rearwardly from the forward ends of sides 5 of the vehicle frame. The ends of back $a$ extend to points in alinement with the front wheels of the vehicle $b$ and thereby operate to prevent contact between these and an object coming into contact with the back portion $a$ of the receiver from the front thereof. In the embodiment shown the upper side bar 6 of the frame of back portion $a$ is provided adjacent to its opposite ends with yokes 7 bolted to the side bar 6 as at 8. The yokes 7 embrace the forward ends of the sides 5 of the vehicle frame and are bolted thereto as indicated by 9, all of which is shown in Figures 3 and 4. The lower side bar 10 of the frame of back portion $a$ is connected by brace bars 11, one of which is shown in Figures 1 and 4, to the front axle 12 of the vehicle. In the embodiment shown the forward ends of bars 11 are screwed into openings in the side bar 10, and the rear ends of the bars extend upwardly and around the lower side of axle 12 and are secured by straps 14 extending downwardly and around the upper side of axle 12 and bolted to the brace bars 11 as indicated by 15. A series of spaced metallic strips 16 are disposed between the end bars 17 of the frame of back member $a$ and are secured at one end as by rivets 18 to the upper side bar 6. The lower end portions of strips 16 are welded or otherwise secured to the lower side bar 10, and terminate in curved portions constituting eyes 19. A rock shaft 20 is journalled in eyes 19 and provides a turnable support for the tiltable projector $c$ of the receiver.

The front side 21 of the projector curves forwardly and inwardly from opposite end portions of rock shaft 20 and a series of spaced metallic strips 22 interfitting with the strips 16 have their inner ends curved to provide eyes which receive the rock shaft 20 to which the strips are fixedly secured as by bolts 23. The forward end of strips 22 are secured to the front side 21 of the projector as by rivets 24. Crank arms 25 secured to the opposite ends of rock shaft 20 are connected by the rod 26. A link 27 has one end connected as at 28 to tie rod 26, and its opposite end is connected as at 29 to an operating lever 30 fulcrumed at 31 to the body of vehicle $b$. A latch lever 32 cooperates with a notched keeper 33 to lock the latch lever in the positions shown by full and dotted lines in Figure 1.

In using the device while the vehicle is underway, the lever 32 is moved to the full line position in Figure 1 whereupon the projector $c$ is caused to extend downwardly and forwardly to a position slightly above the road. In this position of the projector, the receiver as a whole is enabled to prevent the wheels of the vehicle from rolling over a person accidentally struck by the projector when the vehicle is underway; it being obvious that in colliding with a person the projector operates as a trip so that the person struck either falls into the receiver or is cast laterally outward with respect to the vehicle. When the vehicle is parked and the lever 30 moved to the dotted line position of Figure 1, the projector is caused to turn upwardly to the dotted line position in the said figure and is thereby enabled to function as a shield or bumper in that it protects the mud guards and head lamps of the vehicle from accidental collision with another vehicle manoeuvering into or out of an adjacent parking space.

Although I have shown and described one embodiment of my invention, it is to be understood that the same is susceptible of various changes; and I reserve the right to employ such as may come within the scope of the appended claims.

I claim:

1. In a vehicle fender a rear portion comprising a frame and a series of spaced strips secured to opposite portions of the frame, a rock shaft carried by the frame, means for fixedly securing the said rear portion to the front end of a vehicle frame, a projector fixedly secured to the rock shaft and including a frame having a series of spaced transverse strips, and means adapted to be operated from the driver's seat of the vehicle and connected to the rock shaft for operating the same to turn the projector to a position downwardly and forwardly from the said rear portion and vertically upward to a position in front of the frame of the vehicle.

2. In a vehicle fender, a rear portion comprising a frame and a series of spaced transverse strips carried by the frame, said strips terminating in one end in eyes, a rock shaft journalled in the said eyes, means for fixedly securing the said rear portion to the front end and axle of a vehicle, a projector fixedly secured to the rock shaft and including a frame having a series of spaced transverse strips, and means adapted to be operated from the driver's seat of the vehicle and connected to the rock shaft for operating the same to turn the projector to a position downwardly and forwardly from the said rear portion and vertically upward to a position in front of the frame of the vehicle.

3. In a vehicle fender, a rear portion comprising a frame and a series of spaced transverse strips carried by the frame, said strips terminating in one end in eyes, a rock shaft journalled in the said eyes, means for fixedly securing the said rear portion to the front end and axle of a vehicle, a projector including a frame having a series of spaced transverse strips fixedly secured to the rock shaft and intervening strips of the rear portion and means adapted to be operated from the driver's seat of the vehicle and connected to the rock shaft for operating the same to turn the projector to a position downwardly and forwardly from the said rear portion and vertically upward to a position in front of the frame of the vehicle.

JAMES B. HENRY.